United States Patent
Chen et al.

(10) Patent No.: US 11,867,439 B2
(45) Date of Patent: Jan. 9, 2024

(54) STATOR ASSEMBLY, ELECTRONIC EXPANSION VALVE AND REFRIGERATION DEVICE

(71) Applicant: GUANGDONG MEIZHI COMPRESSOR CO., LTD., Guangdong (CN)

(72) Inventors: Chao Chen, Guangdong (CN); Longhua Huang, Guangdong (CN); Mao Yang, Guangdong (CN); Bo Jiang, Guangdong (CN)

(73) Assignee: GUANGDONG MEIZHI COMPRESSOR CO., LTD., Guangdong (CN)

( * ) Notice: Subject to any disclaimer, the term of this patent is extended or adjusted under 35 U.S.C. 154(b) by 0 days.

(21) Appl. No.: 17/748,501

(22) Filed: May 19, 2022

(65) Prior Publication Data
US 2022/0275985 A1 Sep. 1, 2022

Related U.S. Application Data

(63) Continuation of application No. PCT/CN2021/120737, filed on Sep. 26, 2021.

(30) Foreign Application Priority Data

Dec. 14, 2020 (CN) .......................... 202023026610.9

(51) Int. Cl.
*F25B 41/34* (2021.01)
*F16K 31/06* (2006.01)
*F16K 51/00* (2006.01)

(52) U.S. Cl.
CPC .............. *F25B 41/34* (2021.01); *F16K 31/06* (2013.01); *F16K 51/00* (2013.01)

(58) Field of Classification Search
CPC .......... F16K 51/00; F16K 31/06; F16K 27/12; F16K 31/0675; F25B 41/34; H02K 5/04
See application file for complete search history.

(56) References Cited

U.S. PATENT DOCUMENTS

| | | | |
|---|---|---|---|
| 2003/0201413 A1* | 10/2003 | Hirota | F25B 41/34 251/30.01 |
| 2007/0040138 A1* | 2/2007 | Sekiya | F16K 11/0743 251/129.11 |
| 2014/0123698 A1* | 5/2014 | Zhang | F25B 39/02 62/527 |

FOREIGN PATENT DOCUMENTS

| | | |
|---|---|---|
| CN | 101101063 A | 1/2008 |
| CN | 204201230 U | 3/2015 |

(Continued)

OTHER PUBLICATIONS

International Search Report dated Nov. 24, 2021 received in International Application No. PCT/CN2021/120737 together with an English language translation.

(Continued)

*Primary Examiner* — Jessica Cahill
(74) *Attorney, Agent, or Firm* — Scully, Scott, Murphy & Presser, P.C.

(57) ABSTRACT

A stator assembly, an electronic expansion valve, and a refrigeration device are provided. The stator assembly has a housing, a coil assembly and a fixing member. An outer surface of the housing is provided with an installation opening. The coil assembly is provided in the housing, and has a shell for mounting a coil. The fixing member is inserted through the installation opening to be fixedly connected with the shell, and the is configured to connect with the conducting tube of the electronic expansion valve to electrically conduct the shell and the conducting tube.

15 Claims, 6 Drawing Sheets

(56) References Cited

FOREIGN PATENT DOCUMENTS

| | | |
|---|---|---|
| CN | 205978733 U | 2/2017 |
| CN | 109780301 A | 5/2019 |
| CN | 210273759 U | 4/2020 |
| CN | 213954489 U | 8/2021 |
| CN | 214500188 U | 10/2021 |
| JP | 2007134553 A | 5/2007 |
| JP | 2008014345 A | 1/2008 |
| WO | WO-2006064865 A1 * | 6/2006 ........... F16K 31/047 |
| WO | WO-2016003139 A1 * | 1/2016 ............... F01M 1/00 |

OTHER PUBLICATIONS

Notice of Reasons for Refusal dated May 9, 2023 received in Japanese Patent Application No. JP 2022-530283.
Supplementary European Search Report dated Aug. 3, 2023 received in Euroepan Patent Application No. EP 21887887.4.

* cited by examiner

STATOR ASSEMBLY, ELECTRONIC EXPANSION VALVE AND REFRIGERATION DEVICE

CROSS-REFERENCE TO RELATED APPLICATIONS

This application is a continuation application of PCT International Application No. PCT/CN2021/120737, filed on Sep. 26, 2021, which claims priority to and benefits of Chinese Patent Application No. 202023026610.9, filed on Dec. 14, 2020, the entire contents of which are incorporated herein by reference for all purposes. No new matter has been introduced.

FIELD

The present disclosure relates to the field of manufacturing an electronic expansion valve, and in particular, to a stator assembly, an electronic expansion valve and a refrigeration device.

BACKGROUND

Nowadays, refrigeration device (such as, air conditioners, refrigerators, etc.) on the market is usually equipped with an electronic expansion valve, so as to use the electronic expansion valve to adjust the refrigerant flow on the refrigerant circulation pipeline. The electronic expansion valve generally includes a valve body and a stator assembly nested on the valve body to drive a rotor of the valve body to rotate. A conventional stator assembly includes a coil assembly for nesting with the valve body, and the conductor frame of the coil assembly is provided with magnetic pole teeth for contact with the valve body. However, these magnetic pole teeth are not completely able to contact the valve body, and there is a gap between the two. In this state, when an instantaneous pulse voltage of several kV (such as a lightning strike) is generated on the coil assembly, the current on the coil assembly is difficult to conduct. As a result, it is easy to generate discharge between the magnetic pole teeth and the housing of the valve body, thereby interfering with the surrounding circuits, and even breaking down the housing of the valve body, resulting in a significant safety hazard.

SUMMARY

The main objective of the present disclosure is to at least provide an electronic expansion valve, and the stator assembly is applied to the electronic expansion valve, which aims to at least reduce the discharge of the coil assembly of the stator assembly due to high-voltage pulses, so as to improve the safety performance of the electronic expansion valve.

In order to achieve the above objective, the present disclosure provides an electronic expansion valve. The electronic expansion valve includes a housing, a coil assembly and a fixing member. An outer surface of the housing is provided with an installation opening; the coil assembly is provided in the housing, the coil assembly includes a metal shell for mounting a coil; and the fixing member is inserted through the installation opening to be fixedly connected with the metal shell, and the fixing member is configured for connecting with the conducting tube of the electronic expansion valve to electrically conduct the metal shell and the conducting tube.

In an embodiment, an annular protrusion is provided on an outer side of the housing along a periphery of the installation opening, and an installation groove is formed inside the annular protrusion for the fixing member to be fixedly installed.

In an embodiment, the fixing member includes a base and two clamping arms extending from both ends of the base, the base is fixed in the installation groove, and is fixedly connected with the metal shell, and the two clamping arms are configured for clamping the conducting tube.

In an embodiment, the metal shell has a connection surface opposite to the installation opening, the base is provided with a fixing hole, and the base is fixedly connected with the connection surface through the fixing hole.

In an embodiment, the connection surface is provided with a protruding portion extending into the installation opening, and the fixing hole of the base is configured for the protruding portion to be inserted into.

In an embodiment, the connection surface is provided with at least two protruding portions, and the base is provided with one fixing hole corresponding to each protruding portion.

In an embodiment, the base is welded with the connection surface at a position where the fixing hole is located.

In an embodiment, the stator assembly further includes a sealing material filled in the installation groove, the sealing material covering at least the connection surface.

In an embodiment, each of the two clamping arms includes a first arm connected to the base and a second arm extending from the first arm, and the second arm is bent in a direction away from the other clamping arm to form a clamping area for clamping the conducting tube between the second arms of the two clamping arms.

In an embodiment, the first arm of each of the two clamping arms is bent away from the other clamping arm.

In an embodiment, the stator assembly is provided with a channel extending along an axis of the coil assembly, the channel is configured for installing a valve body of the electronic expansion valve, and an inner wall surface of the metal shell of the coil assembly is provided with magnetic pole teeth located in the channel.

The present disclosure further provides an electronic expansion valve, including: a valve body and a stator assembly. The stator assembly is nested on the valve body. The electronic expansion valve includes a housing, a coil assembly and a fixing member. An outer surface of the housing is provided with an installation opening; the coil assembly is provided in the housing, the coil assembly includes a metal shell for mounting a coil; and the fixing member is inserted through the installation opening to be fixedly connected with the metal shell, and the fixing member is configured for connecting with the conducting tube of the electronic expansion valve to electrically conduct the metal shell and the conducting tube.

The present disclosure further provides a refrigeration device, including: a refrigerant circulation pipeline; and an electronic expansion valve. The electronic expansion valve is installed on the refrigerant circulation pipeline. The electronic expansion valve includes a housing, a coil assembly and a fixing member. An outer surface of the housing is provided with an installation opening; the coil assembly is provided in the housing, the coil assembly includes a metal shell for mounting a coil; and the fixing member is inserted through the installation opening to be fixedly connected with the metal shell, and the fixing member is configured for connecting with the conducting tube of the electronic expansion valve to electrically conduct the metal shell and the conducting tube.

In technical solutions of the present disclosure, the outer side of the housing of the stator assembly is equipped with a fixing member. The fixing member is electrically connected with the metal shell of the coil assembly. The fixing member is configured for connecting with the conducting tube of the electronic expansion valve, so as to electrically conduct the coil assembly and the conducting tube of the electronic expansion valve. Therefore, when the coil assembly generates an instantaneous pulse voltage of several kV (such as lightning strike, etc.), the discharge phenomenon between the magnetic pole teeth of the coil assembly and the casing of the valve body is avoided (for details, please refer to the introduction later). Based on this, an installation opening is also provided on the outer surface of the housing, so that the metal shell of the coil assembly can be exposed from the installation opening. Therefore, the operator can insert the fixing member into the interior of the housing through the installation opening, and subsequently the fixing member is fixedly connected with the metal shell.

BRIEF DESCRIPTION OF THE DRAWINGS

In order to more clearly illustrate the embodiments of the present disclosure or the technical solutions in the prior art, the following briefly introduces the accompanying drawings that need to be used in the description of the embodiments or the prior art. Obviously, the drawings in the following description are only some embodiments of the present disclosure. For those of ordinary skill in the art, other drawings can also be obtained based on the structures shown in these drawings without any creative effort.

Description of reference signs shown in the figures is provided in the following table.

| Reference sign | Name |
| --- | --- |
| 100 | stator assembly |
| 110 | housing |
| 111 | installation opening |
| 112 | annular protrusion |
| 113 | installation groove |
| 120 | coil assembly |
| 121 | metal shell |
| 122 | coil |
| 121a | magnetic pole teeth |
| 121b | connection surface |
| 121c | protruding portion |
| 130 | fixing member |
| 131 | base |
| 131a | fixing hole |
| 132 | clamping arm |
| 132a | first arm |
| 132b | second arm |
| 132c | clamping area |

| Reference sign | Name |
| --- | --- |
| 200 | valve body |
| 211 | first conducting tube |
| 212 | second conducting tube |

The realization of the objective, functional characteristics, and advantages of the present disclosure are further described with reference to the accompanying drawings.

DETAILED DESCRIPTION OF EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

In addition, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. Besides, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

Figure 1:
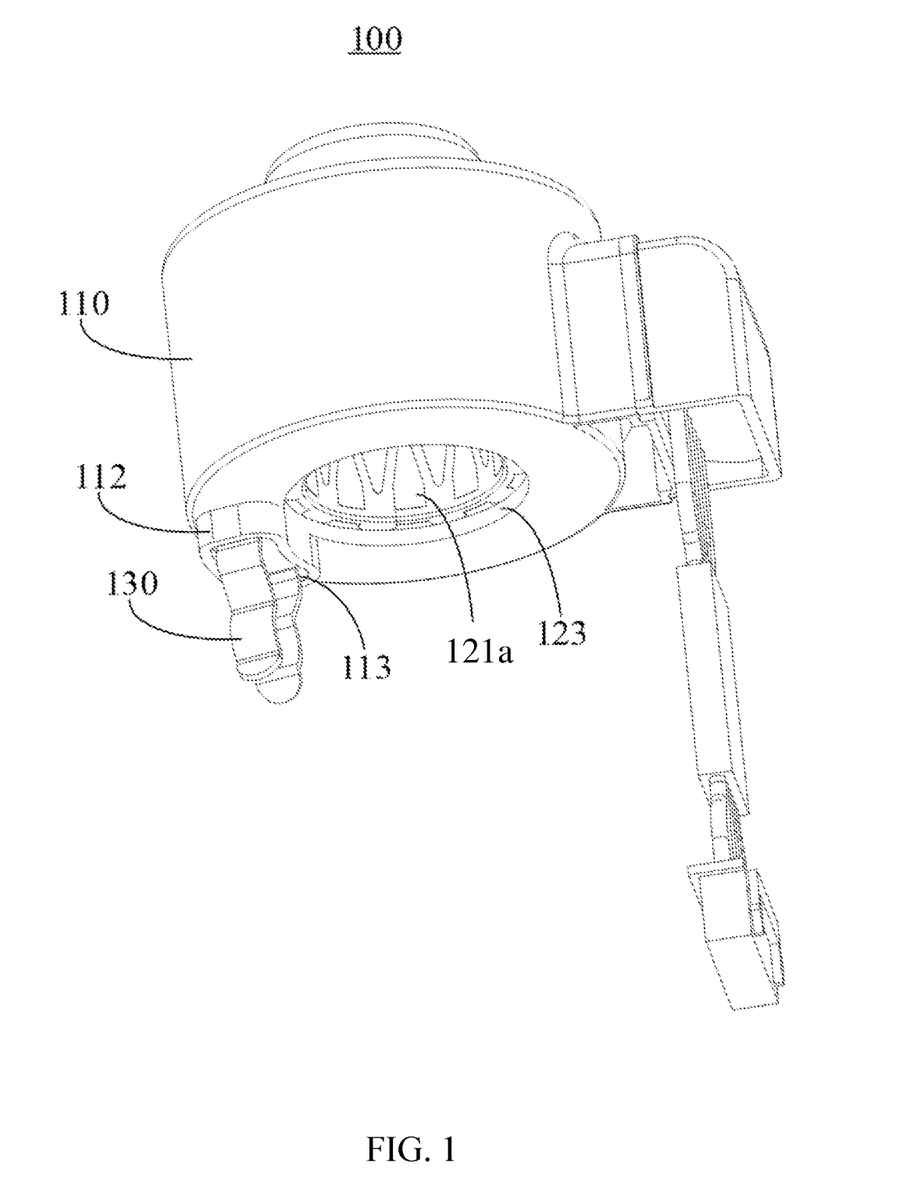
FIG. 1 is a schematic structural view of a stator assembly according to an embodiment of the present disclosure.

As shown in FIG. 1, the present disclosure provides an embodiment of a stator assembly 100. The stator assembly 100 is applied to an electronic expansion valve, which aims to reduce the occurrence of the discharge of the coil assembly 120 of the stator assembly 100 due to high-voltage pulses, thereby improving the safety performance of the electronic expansion valve.

Figure 2:
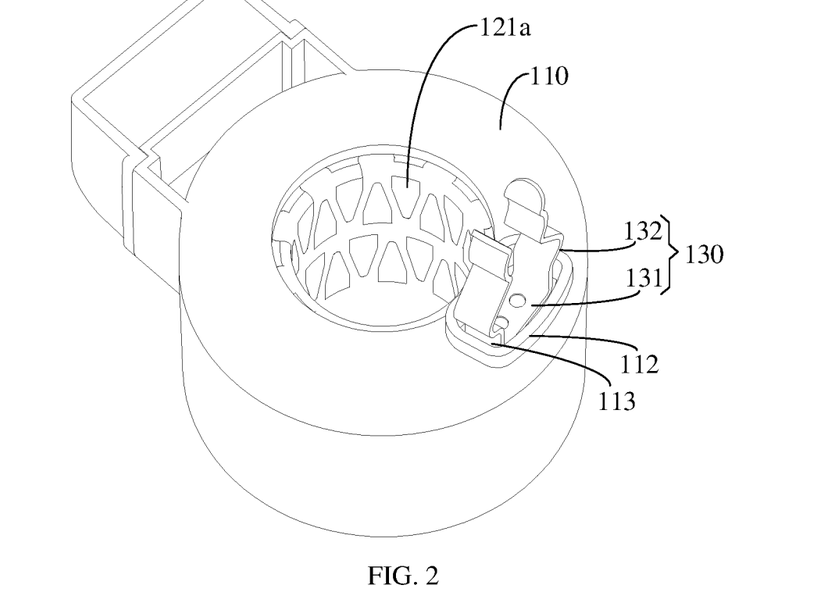
FIG. 2 is a schematic structural view of the stator assembly in FIG. 1 from another perspective.
Figure 3:
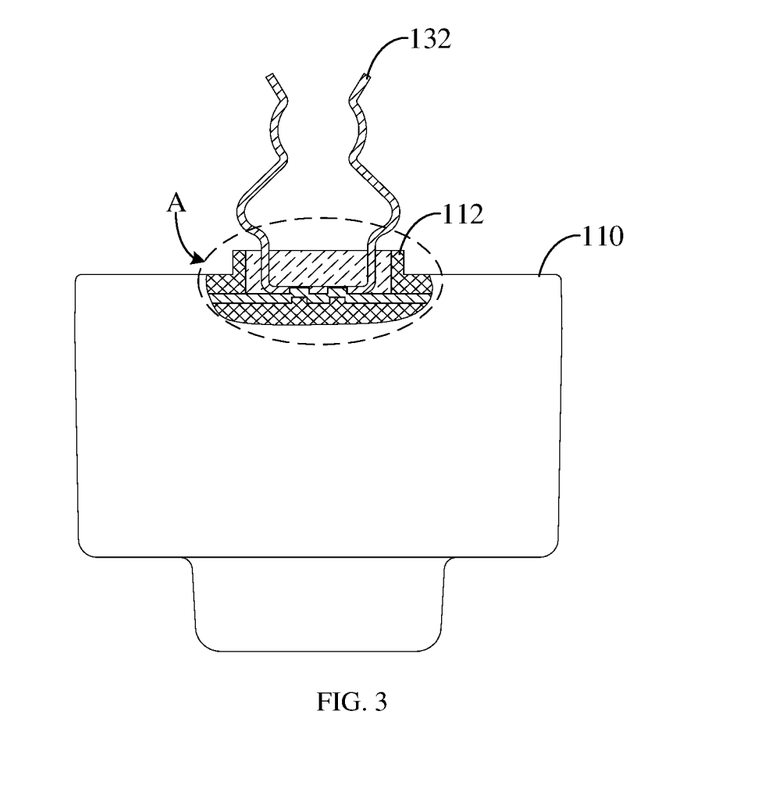
FIG. 3 is a partial cross-sectional view of the stator assembly in FIG. 2.

As shown in FIG. 1 to FIG. 3, in an embodiment of the present disclosure, the stator assembly 100 includes a housing 110, a coil assembly 120 and a fixing member 130. An outer surface of the housing 110 is provided with an installation opening 111. The coil assembly 120 is provided in the housing 110, and the coil assembly 120 includes a metal shell 121 for mounting a coil 122. The fixing member 130 is inserted through the installation opening 111 to be fixed with the metal shell 121, and the fixing member 130 is fixed with the conducting tube of the electronic expansion valve to electrically conduct the metal shell 121 and the conducting tube.

The housing 110 of the stator assembly 100 is made of plastic material, so that the housing 110 has no electrical conductivity, thereby improving the safety performance of the stator assembly 100. The metal shell 121 of the coil assembly 120 of the stator assembly 100 is made of metal material, such as a cold-rolled plate, so that the metal shell 121 has both electrical conductivity and magnetic permeability. The coil 122 of the coil assembly 120 is wound in the metal shell 121. The stator assembly 100 is provided with a channel extending along the axis of the coil assembly 120, and an inner wall surface of the metal shell 121 of the coil assembly 120 is provided with magnetic pole teeth 121a located in the channel.

As shown in FIG. 1 to FIG. 7, when the stator assembly 100 is assembled with the valve body 200 of the electronic expansion valve, the valve body 200 is first inserted into the channel of the stator assembly 100, and the casing 210 of the valve body 200 is in contact with the magnetic pole teeth 121a, so that the valve body 200 and the stator assembly 100 are nested or engaged together. Subsequently, the fixing member 130 on the outer side of the stator assembly 100 is fixedly connected to the conducting tube of the valve body 200, so that the coil assembly 120 is electrically connected to the ground through the conducting tube. Therefore, when the coil assembly 120 of the stator assembly 100 generates an instantaneous pulse voltage of several kV (such as a lightning strike, etc.), the current on the coil assembly 120 is conducted to the conducting tube of the electronic expansion valve through the fixing member 130, and subsequently conducted out through the conducting tube (e.g., conducted to the ground). Therefore, it is difficult to generate discharge between the magnetic pole teeth 121a of the coil assembly 120 and the casing 210 of the valve body 200, thereby avoiding interference with surrounding circuits or breakdown of the casing 210 of the valve body 200.

Figure 7:
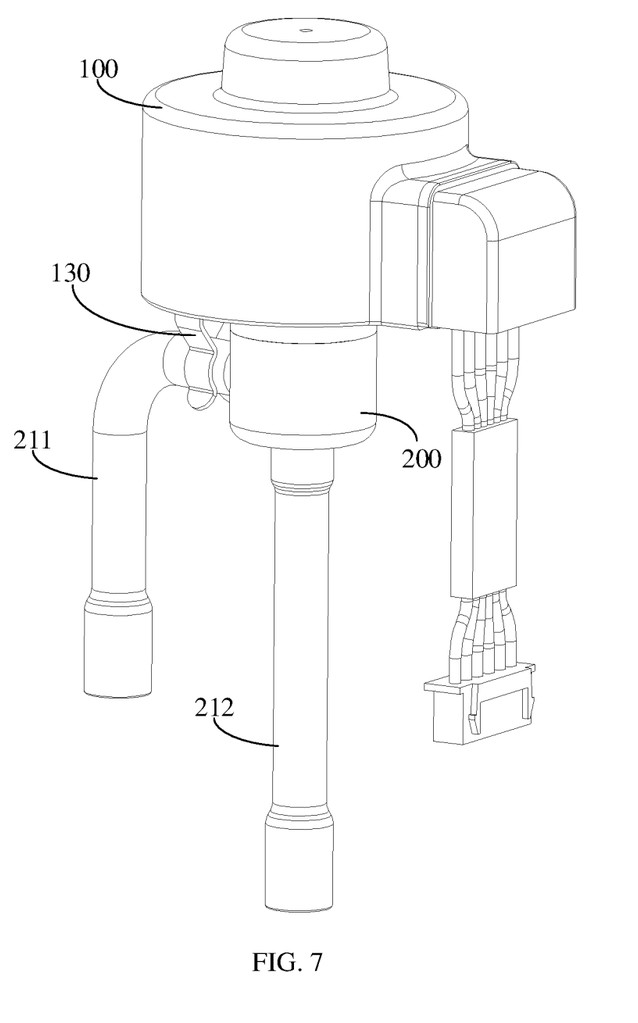
FIG. 7 is a schematic structural view of an electronic expansion valve of the present disclosure.

It should be noted that the conducting tubes (e.g., the conducting pipe) of the valve body 200 of the electronic expansion valve include a first conducting tube 211 and a second conducting tube 212. One of the first conducting tube 211 and the second conducting tube 212 is an inlet conducting pipe, and the other is an outlet conducting pipe. The fixing member 130 of the stator assembly 100 may be fixedly connected with the first conducting tube 211 or may be fixedly connected with the second conducting tube 212, which is not limited herein.

In this embodiment, considering that the coil assembly 120 is enclosed by the housing 110 and is blocked by the housing 110, the fixing member 130 is not easy to be directly connected and assembled with the metal shell 121 of the coil assembly 120. Therefore, an installation opening 111 is provided on the outer surface of the housing 110, so that the metal shell 121 of the coil assembly 120 can be exposed from the installation opening 111, the operator can insert the fixing member 130 into the interior of the housing 110 through the installation opening 111, and subsequently the fixing member 130 is fixedly connected with the metal shell 121.

Since the fixing member 130 is used to electrically connect the coil assembly 120 and the valve body 200 of the electronic expansion valve, the fixing member 130 should be made of material with electrical conductivity, for example, the fixing member 130 should be made of metal material. It is worth mentioning that, in order to prevent the fixing member 130 from affecting the magnetic force of the coil assembly 120, in an embodiment, the fixing member 130 is made of a non-magnetic metal material.

The fixing method of the fixing member 130 and the metal shell 121 may be welding or riveting. The connection method between the fixing member 130 and the conducting tube of the electronic expansion valve may be a clamping connection or a clamping connection, which will be described in detail later.

In technical solutions of the present disclosure, the outer side of the housing 110 of the stator assembly 100 is equipped with a fixing member 130. The fixing member 130 is electrically connected with the metal shell 121 of the coil assembly 120. The fixing member 130 is used for clamping and fixing to the valve body 200 of the electronic expansion valve, so as to electrically conduct the coil assembly 120 and the valve body 200 of the electronic expansion valve. Therefore, when the coil assembly 120 generates an instantaneous pulse voltage of several kV (such as, lightning strike, etc.), the discharge phenomenon between the magnetic pole teeth 121a of the coil assembly 120 and the casing 210 of the valve body 200 is avoided (for details, please refer to the introduction later). Based on this, in order to facilitate the connection and fixation between the fixing member 130 and the metal shell 121 of the coil assembly 120, an installation opening 111 is also provided on the outer surface of the housing 110, so that the metal shell 121 of the coil assembly 120 can be exposed from the installation opening 111. Therefore, the operator can insert the fixing member 130 into the interior of the housing 110 through the installation opening 111, and subsequently the fixing member 130 is fixedly connected with the metal shell 121.

Figure 4:
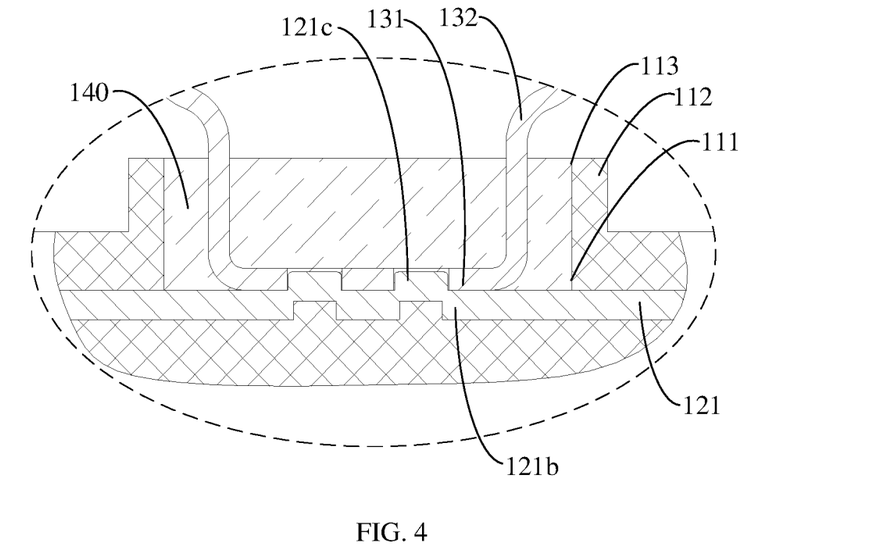
FIG. 4 is an enlarged view of portion A in FIG. 3.
Figure 5:
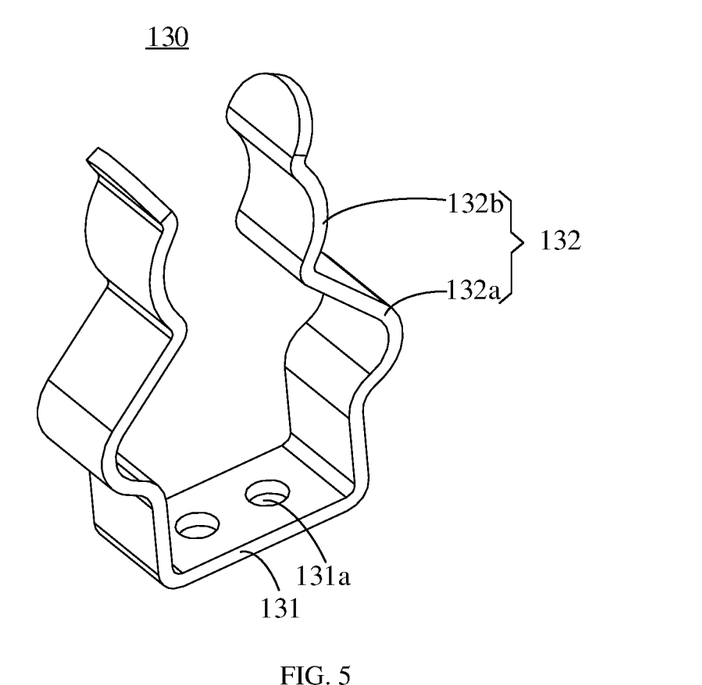
FIG. 5 is a schematic structural view of a fixing member of the stator assembly of the present disclosure.

As shown in FIG. 3 to FIG. 5, in an embodiment, an annular protrusion 112 is provided on an outer side of the housing 110 along a periphery of the installation opening 111, and an installation groove 113 is formed inside the annular protrusion 112 for the fixing member 130 to be installed. The installation groove 113 communicates with the installation opening 111. When installing the fixing member 130, the base 131 of the fixing member 130 is extended into the installation groove 113, and the base 131 is pressed against the surface of the metal shell 121, and subsequently the base 131 and the metal shell 121 are riveted or welded.

The annular protrusion 112 not only increases the space for assembling the fixing member 130 and the metal shell 121, but also can accommodate more solder or sealing material. The annular protrusion 112 surrounds the installation opening 111, so that the water droplets on the outer surface of the housing 110 are not easy to fall into the installation opening 111, and also difficult to enter the coil assembly 120, which has a better waterproof effect.

As shown in FIG. 3 to FIG. 5, in an embodiment, the fixing member 130 includes a base 31 and two clamping arms 132 extending from both ends of the base 131. The base 131 is fixed in the installation groove 113 and is fixedly connected with the metal shell 121, and the two clamping arms 132 are configured for clamping on the conducting tube of the valve body 200.

The base 131 of the fixing member 130 cooperates with the two clamping arms 132 and is arranged in a U-like shape. The base 131 is fixedly connected with the metal shell 121, and the connection is also an electrical connection. The two clamping arms 132 are disposed opposite to each other, and the two clamping arms 132 are clamped on the conducting tube of the valve body 200 to be electrically connected. The structure of the fixing member 130 is not limited to this. In other embodiments, the fixing member 130 is designed as a structure having a clamping and fixing function, such as an elastic buckle or a clamping claw.

Further, the metal shell 121 has a connection surface 121b opposite to the installation groove 113, the base 131 is provided with a fixing hole 131a, and the base 131 is fixedly connected to the connection surface 121b through the fixing hole 131a. As for the connection manner of the fixing hole 131a and the connection surface 121b, two implementations are listed below.

In an embodiment, the connection surface 121b is provided with a protruding portion 121c extending into the installation opening 111; the fixing hole 131a of the base 131 is for the protruding portion 121c to be inserted into. In one embodiment, the fixing hole 131a and the protruding portion 121c are in an interference fit, and the fixing member 130 and the metal shell 121 can be connected and fixed after the two fit together. Since the protruding portion 121c is a part of the metal shell 121, after the fixing hole 131a and the protruding portion 121c are inserted and matched, they are in electrical contact and communication with each other.

During the above process of extending the base 131 of the fixing member 130 into the installation groove 113, the protruding portions 121c on the connection surface 121b of the metal shell 121 are correspondingly inserted into the fixing holes 131a of the base 131, the protruding portion 121c is in interference fit with the fixing hole 131a, so as to confine the fixing member 130 in the installation groove 113. In this way, operations such as welding or snapping on the fixing member 130 can be performed without holding the fixing member 130 by hand.

The number of the protruding portions 121c may be one, two or more, which is not specifically limited herein. According to the number of the protruding portions 121c, the number of the fixing holes 131a on the fixing member 130 is reasonably arranged, so that each protruding portion 121c corresponds to a fixing hole 131a for inserting and matching with the corresponding protruding portion 121c. In one embodiment, the fixing member 130 is provided with at least two fixing holes 131a; the metal shell 121 is provided with at least two protruding portions 121c, and each protruding portion 121c is inserted into the fixing hole 131a opposite to it.

In another embodiment, the base 131 is connected to the connection surface 121b by welding at the position where the fixing hole 131a is located. During welding, the welding material is melted and solidified between the fixing hole 131a of the base 131 and the connection surface 121b to form a welding structure, the welding structure not only connects and fixes the base 131 of the fixing member 130 and the connection surface 121b, but also electrically conducts the two, so that the connection surface 121b and the metal shell 121 are electrically connected.

Based on any of the above embodiments, considering that if the connection surface 121b of the metal shell 121 is directly exposed to the environment through the installation groove 113, moisture in the environment may enter into the metal shell 121 through the installation groove 113, which may easily cause a short circuit of the coil assembly 120. In view of this, in order to avoid this situation, in an embodiment, the stator assembly 100 further includes a sealing material 140 filled in the installation groove 113, and the sealing material 140 at least covers the connection surface 121b.

The sealing material 140 fills the installation groove 113 to cover the installation groove 113, so that it is difficult for water droplets in the environment to flow into the metal shell 121 through the installation groove 113, so as to ensure the safe and stable operation of the coil assembly 120. As for the specific type of the sealing material 140, the sealing material 140 is optionally made of a material with insulating properties and waterproof properties, such as, a silicone material, a rubber material, and the like.

Figure 6:
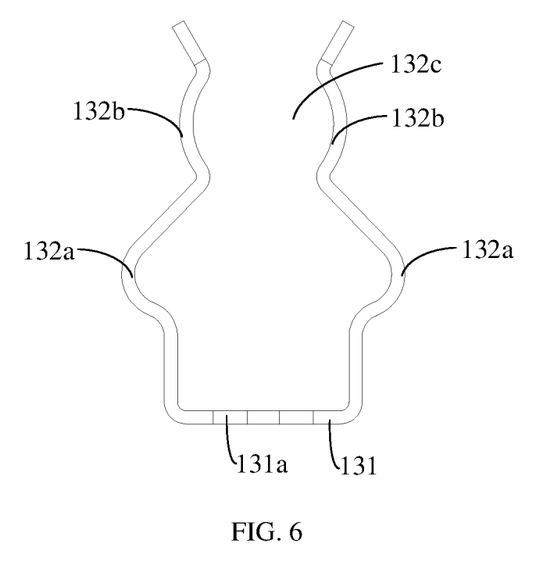
FIG. 6 is a schematic structural view of the fixing member in FIG. 5 from another perspective.

As shown in FIG. 4 to FIG. 6, based on any of the above embodiments, each of the two clamping arms 132 includes a first arm 132a connected to the base 131 and a second arm 132b extending from the first arm 132a, and the second arm 132b is bent in a direction away from the other clamping arm 132 to form a clamping area 132c for clamping the conducting tube between the second arms 132b of the two clamping arms 132.

The two clamping arms 132 of the fixing member 130 have elasticity, so that the two clamping arms 132 can be elastically opened and clamped. When clamping the fixing member 130 on the valve body 200, it is possible to first open the two clamping arms 132 of the fixing member 130 to both sides of the conducting tube of the valve body 200, and release the two clamping arms 132 of the fixing member 130. The two clamping arms 132 can clamp the conducting tube in the clamping area 132c, so that the fixing member 130 can be clamped and fixed on the valve body 200. When disassembling, the valve body 200 can be released by applying external force to the two clamping arms 132 to open, and subsequently the fixing member 130 can be disassembled.

Further, the first arm 132a of each clamping arm 132 is bent in a direction away from the other clamping arm 132. In this way, each clamping arm 132 can be formed with two bending positions, so that the elasticity of the clamping arm 132 can be increased. Therefore, the fixing member 130 can be adapted to hold more conducting tubes with different diameters, thereby improving the applicability of the fixing member 130, and consequently, the applicability of the electronic expansion valve.

Figure 8:
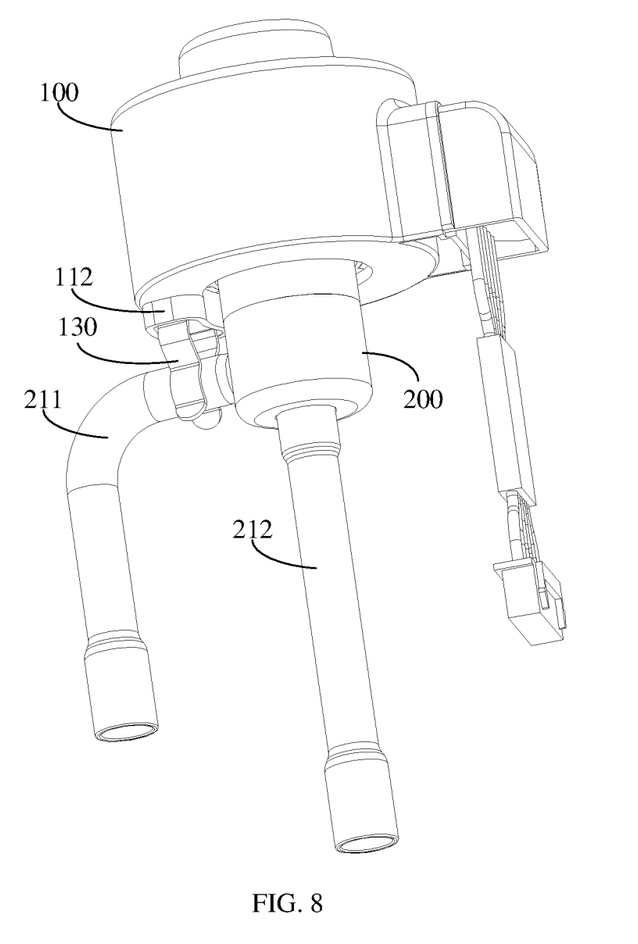
FIG. 8 is a schematic structural view of the electronic expansion valve in FIG. 7 from another perspective.

As shown in FIG. 7 and FIG. 8, the present disclosure further provides an electronic expansion valve, the electronic expansion valve includes a valve body 200 and a stator assembly 100, and the stator assembly 100 is nested on the valve body 200. The valve body 200 is provided with a first conducting tube 211 and a second conducting tube 212, and both the first conducting tube 211 and the second conducting tube 212 belong to the conducting tube of the valve body 200. The detailed structure of the stator assembly 100 refers to the above-mentioned embodiments. The fixing member 130 of the stator assembly 100 is connected and fixed with the first conducting tube 211 or the second conducting tube 212. Since the electronic expansion valve adopts all the technical solutions of the above-mentioned embodiments, it also has all the beneficial effects brought by the technical solutions of the above-mentioned embodiments, which will not be repeated here.

The first conducting tube 211 serves as an inlet conducting pipe, and the second conducting tube 212 serves as an outlet conducting pipe. Since the first conducting tube 211 and the second conducting tube 212 are usually metal pipes, such as copper pipes, both the first conducting tube 211 and the second conducting tube 212 have acceptable electrical conductivity. Based on this, the fixing member 130 can be fixedly connected with the first conducting tube 211 or the second conducting tube 212 of the valve body 200, which can be connected through the ground. Since the first conducting tube 211 extends axially (horizontally) perpendicular to the channel 123 of the stator assembly 100, the second conducting tube 212 axially extends along the channel 123 of the stator assembly 100, so that the first conducting tube 211 is relatively close to the fixing member 130 and is opposite to the fixing member 130. Therefore, the fixing member 130 can be optionally clamped and fixed to the first conducting tube 211, and the clamping difficulty is less when the distance is shorter.

As shown in FIG. 7 and FIG. 8, the manner, in which the fixing member 130 is clamped with the first conducting tube 211 and/or the second conducting tube 212, is provided as follows. As described in the previous embodiment, the fixing member 130 has two clamping arms 132 (as shown in FIG. 5), the two clamping arms 132 are clamped on the first conducting tube 211 or the second conducting tube 212, so that the fixing member 130 is fixedly connected to the first conducting tube 211 or the second conducting tube 212. The manner in which the fixing member 130 is connected to the first conducting tube 211 or the second conducting tube 212 is not limited thereto, and in other embodiments, screw fixing or bundling fixing may also be used.

The present disclosure also provides a refrigeration device, the refrigeration device includes a refrigerant circulation pipeline and an electronic expansion valve, and the electronic expansion valve is installed on the refrigerant circulation pipeline. The specific structure of the electronic expansion valve refers to the above-mentioned embodiment. Since the refrigeration device adopts all the technical solutions of the above-mentioned embodiments, it also has all the beneficial effects brought by the technical solutions of the above-mentioned embodiments, which will not be repeated herein.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A stator assembly applied to an electronic expansion valve, wherein the electronic expansion valve has a conducting tube, the stator assembly comprising:
   a housing, an outer surface of the housing being provided with an installation opening;
   a coil assembly provided in the housing, the coil assembly comprising a shell for mounting a coil; and
   a fixing member, the fixing member being inserted through the installation opening to be fixedly connected with the shell, the fixing member configured for connecting with the conducting tube of the electronic expansion valve to electrically conduct the shell and the conducting tube,
   wherein:
   the shell has a connection surface opposite to the installation opening,
   the fixing member comprises a base, wherein the base is provided with a fixing hole and is fixedly connected with the connection surface through the fixing hole,
   the connection surface is provided with a protruding portion extending into the installation opening, and
   the fixing hole of the base is configured to receive the protruding portion.

2. The stator assembly of claim 1, wherein:
   an annular protrusion is provided on an outer side of the housing along a periphery of the installation opening, and
   an installation groove is formed inside the annular protrusion for the fixing member to be fixedly installed.

3. The stator assembly of claim 2, wherein:
   the fixing member further comprises two clamping arms extending from both ends of the base,
   the base is fixed in the installation groove, and is fixedly connected with the shell, and
   the two clamping arms are configured for clamping the conducting tube.

4. The stator assembly of claim 3, wherein:
   the connection surface is provided with at least two protruding portions, and
   the base is provided with one fixing hole corresponding to each protruding portion.

5. The stator assembly of claim 4, wherein the stator assembly further comprises a sealing material filled in the installation groove, the sealing material covering at least the connection surface.

6. The stator assembly of claim 4, wherein:
   each of the two clamping arms comprises a first arm connected to the base and a second arm extending from the first arm, and
   the second arm is bent in a direction away from the other clamping arm to form a clamping area for clamping the conducting tube between the second arms of the two clamping arms.

7. The stator assembly of claim 3, wherein the base is welded with the connection surface at a position where the fixing hole is located.

8. The stator assembly of claim 7, wherein the stator assembly further comprises a sealing material filled in the installation groove, the sealing material covering at least the connection surface.

9. The stator assembly of claim 7, wherein:
   each of the two clamping arms comprises a first arm connected to the base and a second arm extending from the first arm, and
   the second arm is bent in a direction away from the other clamping arm to form a clamping area for clamping the conducting tube between the second arms of the two clamping arms.

10. The stator assembly of claim 3, wherein the stator assembly further comprises a sealing material filled in the installation groove, the sealing material covering at least the connection surface.

11. The stator assembly of claim 3, wherein:
    each of the two clamping arms comprises a first arm connected to the base and a second arm extending from the first arm, and
    the second arm is bent in a direction away from the other clamping arm to form a clamping area for clamping the conducting tube between the second arms of the two clamping arms.

12. The stator assembly of claim 11, wherein the first arm of each of the two clamping arms is bent away from the other clamping arm.

13. The stator assembly of claim 1, wherein:
    the stator assembly is provided with a channel extending along an axis of the coil assembly, wherein the channel is configured for installing a valve body of the electronic expansion valve, and wherein an inner wall surface of the shell of the coil assembly is provided with magnetic pole teeth located in the channel.

14. An electronic expansion valve comprising:
    a valve body provided with the conducting tube and a second conducting tube; and
    the stator assembly of claim 1, the stator assembly being provided on the valve body, the fixing member of the stator assembly being fixedly connected with the conducting tube or the second conducting tube.

15. A refrigeration device comprising:
    a refrigerant circulation pipeline; and the electronic expansion valve of claim 14, the electronic expansion valve being installed on the refrigerant circulation pipeline.

* * * * *